(12) United States Patent
Helbing (10) Patent No.: US 8,438,480 B2
(45) Date of Patent: May 7, 2013

(54) SYSTEM AND METHOD FOR TRACKING AN INPUT DEVICE USING A DISPLAY SCREEN IN CAPTURED FRAMES OF IMAGE DATA

(75) Inventor: Rene P. Helbing, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 863 days.

(21) Appl. No.: 11/691,464

(22) Filed: Mar. 26, 2007

(65) Prior Publication Data

US 2008/0239081 A1 Oct. 2, 2008

(51) Int. Cl.
*G06F 3/00* (2006.01)

(52) U.S. Cl.
USPC ............ 715/716; 715/700; 715/719; 715/722

(58) Field of Classification Search .................. 715/716, 715/723, 863; 345/158, 148
See application file for complete search history.

(56) References Cited

U.S. PATENT DOCUMENTS

| | | | |
|---|---|---|---|
| 6,275,214 B1 * | 8/2001 | Hansen | 345/158 |
| 6,513,717 B2 * | 2/2003 | Hannigan | 235/462.45 |
| 7,158,676 B1 * | 1/2007 | Rainsford | 382/190 |
| 7,180,510 B2 | 2/2007 | Inoue et al. | |
| 2003/0179911 A1 | 9/2003 | Ho et al. | |
| 2004/0009798 A1 | 1/2004 | Okuda et al. | |
| 2004/0202363 A1 | 10/2004 | Cowperthwaite et al. | |
| 2006/0023111 A1 | 2/2006 | DeMenthon | |
| 2006/0088191 A1 * | 4/2006 | Zhang et al. | 382/107 |
| 2006/0152487 A1 * | 7/2006 | Grunnet-Jepsen et al. | 345/158 |
| 2006/0262188 A1 * | 11/2006 | Elyada et al. | 348/143 |
| 2007/0067745 A1 * | 3/2007 | Choi et al. | 715/863 |

FOREIGN PATENT DOCUMENTS

| | | |
|---|---|---|
| EP | 1879098 | 1/2005 |
| EP | 1011064 | 6/2005 |
| EP | 1879098 | * 12/2006 |
| JP | 2001-325069 | 11/2001 |
| JP | 2004-171414 | 6/2004 |
| JP | 2007/086995 | 4/2007 |
| WO | WO-0060534 | 10/2000 |
| WO | WO-03056505 | 7/2003 |
| WO | WO-2004/079707 | 9/2004 |
| WO | WO-2005/062273 | 7/2005 |
| WO | WO-2007/020549 | 2/2007 |
| WO | WO-2007/017782 | 2/2008 |

* cited by examiner

*Primary Examiner* — Omar Abdul-Ali
*Assistant Examiner* — Sherrod Keaton (57) ABSTRACT

A system and method for tracking an input device uses positional information of a display screen in frames of image data to determine the relative position of the input device with respect to the display screen.

16 Claims, 10 Drawing Sheets

SYSTEM AND METHOD FOR TRACKING AN INPUT DEVICE USING A DISPLAY SCREEN IN CAPTURED FRAMES OF IMAGE DATA

BACKGROUND OF THE INVENTION

In systems for optical navigation, frames of image data are sequentially captured and compared to track displacements of features in the frames relative to the optical navigation system. These relative displacements of the features in the frames can be used to estimate the motion of the features relative to the optical navigation system or the motion of the optical navigation system relative to the features. As an example, the relative displacements of the features can be used to track the movements of a computer mouse to control a cursor on a computer screen.

In some applications, the tracked features may be beacons (e.g., infrared sources) that are captured and used as reference points for optical navigation. The beacon sources are usually stationary, and thus, serve as reference points to determine relative motion of the optical navigation system. This type of optical navigation technique will be referred to herein as a beacon-based navigation technique. Beacon-based navigation techniques are currently used in computer gaming units to track motion of remote input devices for the gaming units.

A concern with conventional beacon-based navigation techniques is that additional hardware is needed to provide the beacons, which adds cost and undesired complexity to the overall system. Another concern is that non-beacon light sources in the field of view, e.g., candles and reflections of light, can be mistaken for the beacons, which can introduce navigation errors.

In some applications, the tracked features may be distinguishing features in a captured image frame. This type of optical navigation technique will be referred to herein as a scene-based navigation technique. Scene-based navigation techniques are similar to the navigation techniques employed in optical computer mice. Positional changes of the distinguishing features captured in successive frames of image data are used to track the motion of the optical navigation system. Scene-based navigation techniques can also be used in computer gaming units to track motion of remote input devices for the gaming units.

A concern with conventional scene-based navigation techniques is that significant navigation errors can sometimes be introduced during navigation. Such navigation errors may not be critical for applications that are not time-sensitive, such as cursor control for word processing applications. However, for time-sensitive applications, such as computer gaming, such navigation errors may not be tolerable.

Thus, there is a need for a system and method for reliably tracking an input device, such as a remote input device of a gaming unit, which does not require beacons sources.

SUMMARY OF THE INVENTION

A system and method for tracking an input device uses positional information of a display screen in frames of image data to determine the relative position of the input device with respect to the display screen. The use of display screen in frames of image data eliminates the need for beacon light sources as references for optical tracking, while increasing the reliability of the optical tracking.

A method for tracking an input device in accordance with an embodiment of the invention comprises electronically capturing at least a portion of a display screen in frames of image data using the input device, extracting positional information of the display screen in the frames of image data, and determining relative position of the input device with respect to the display screen using the positional information of the display screen in the frames of image data.

A system for tracking an input device in accordance with an embodiment of the invention comprises an input device including an image sensor and a navigation engine. The image sensor is configured to capture frames of image data, which include at least a portion of a display screen. The navigation engine is operatively connected to the image sensor to process the frames of image data. The navigation engine is configured to extract positional information of the display screen in the frames of image data. The navigation engine is further configured to determine relative position of the input device with respect to the display screen using the positional information of the display screen in the frames of image data.

Other aspects and advantages of the present invention will become apparent from the following detailed description, taken in conjunction with the accompanying drawings, illustrated by way of example of the principles of the invention.

DETAILED DESCRIPTION

Figure 1:
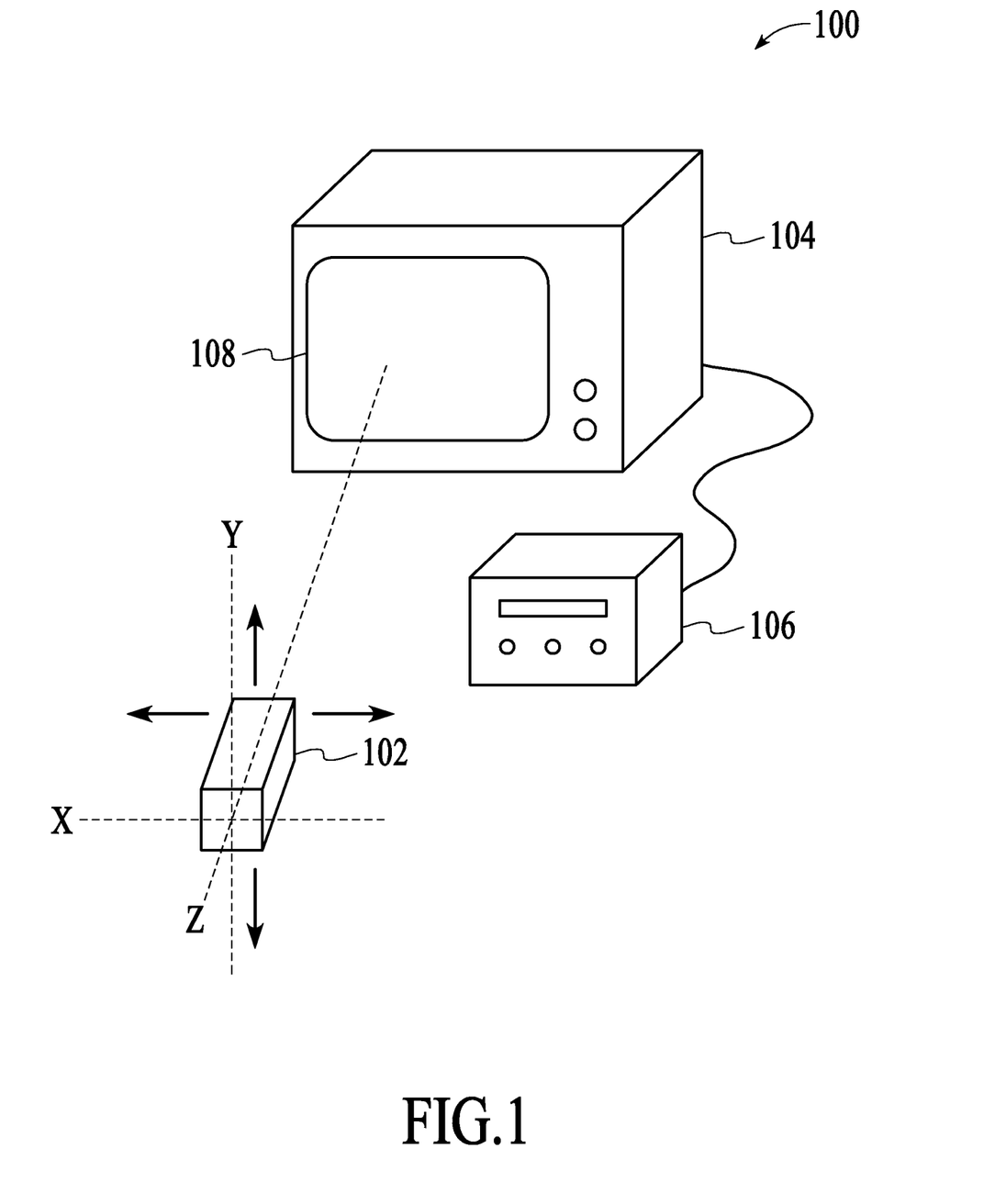
FIG. 1 shows an optical navigation system in accordance with an embodiment of the invention.

With reference to FIG. 1, an optical navigation system 100 in accordance with an embodiment of the invention is described. As shown in FIG. 1, the optical navigation system 100 includes a hand-held controller unit 102, a display device 104 and a console unit 106. In some embodiments, the hand-held controller unit 102 and the console unit 106 are part of a computer gaming system where the hand-held controller unit is an input device of the system to manipulate graphical elements displayed on the display device 104. However, in other embodiments, the optical navigation system 100 is used to implement other types of systems. For example, some embodiments of the optical navigation system 100 may be used to provide an accessible user interface for a computer system.

As described in more detail below, the optical navigation system 100 operates to track the movements of the hand-held controller unit 102 of the system using a display screen 108 of the display device 104 in frames of image data captured by the hand-held controller unit 102. Positional information of the imaged version of the display screen 108 in captured image frames is then used to determine the current position of the hand-held controller unit 102. The positional information of the display screen 108 in a captured image frame may include the location and size of the imaged display screen in the captured image frame with respect to the captured image frame, as well as the shape of the imaged display screen in the captured image frame. The current position of the hand-held controller unit 102 can be the position of the hand-held controller unit relative to the absolute coordinate system with respect to the display screen 108. Alternatively, the current position of the hand-held controller unit 102 can be the position of the hand-held controller unit relative to the previous position of the hand-held controller unit with respect to the display screen 108. This type of tracking using the imaged display screen in a captured image frame will sometimes be referred to herein as a screen-based navigation.

Figure 2A:
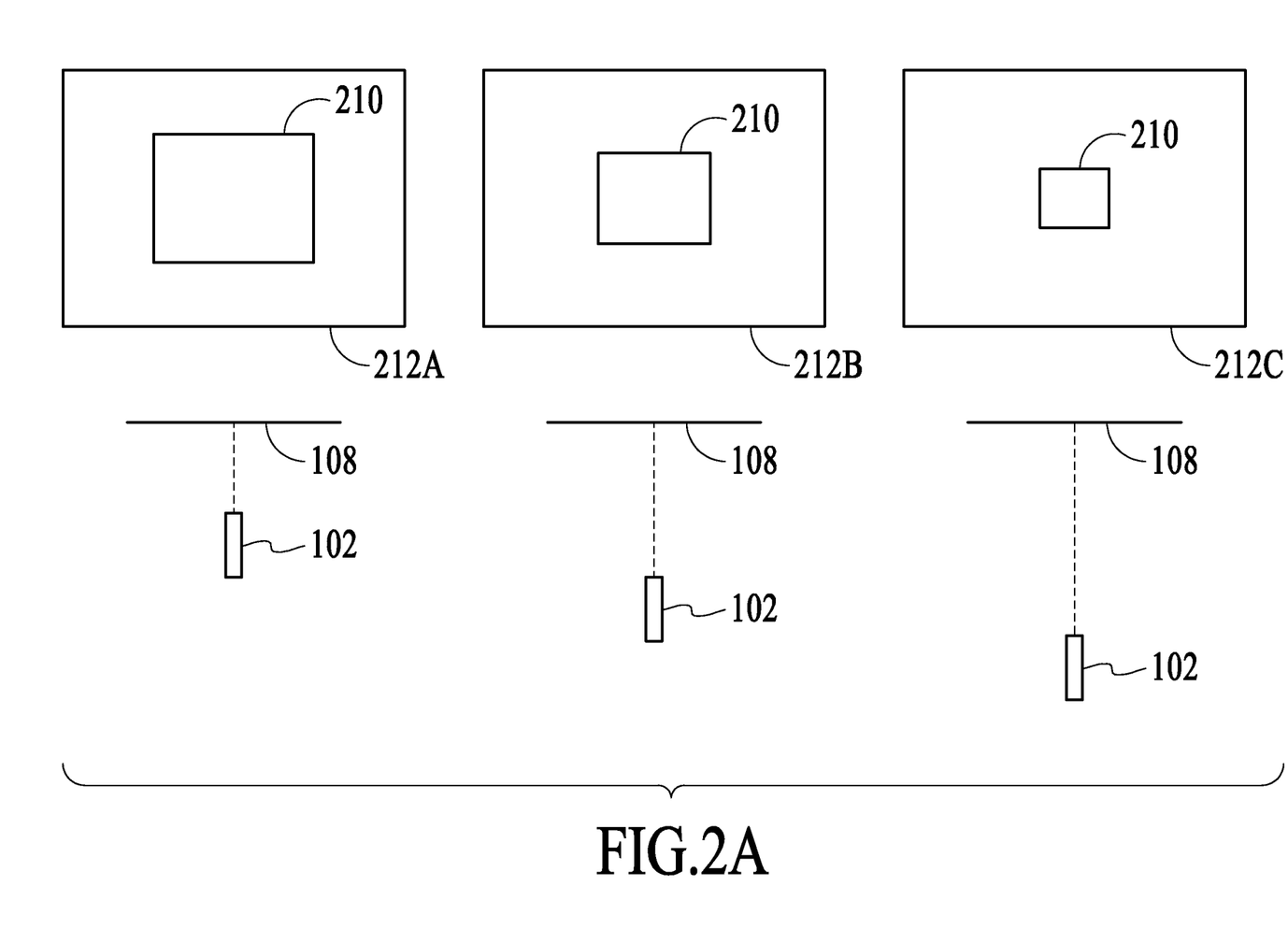
FIG. 2A illustrates an imaged display screen in captured image frames when a hand-held controller unit of the optical navigation system is moved closer or farther from a display screen of the system in accordance with an embodiment of the invention.
Figure 2B:
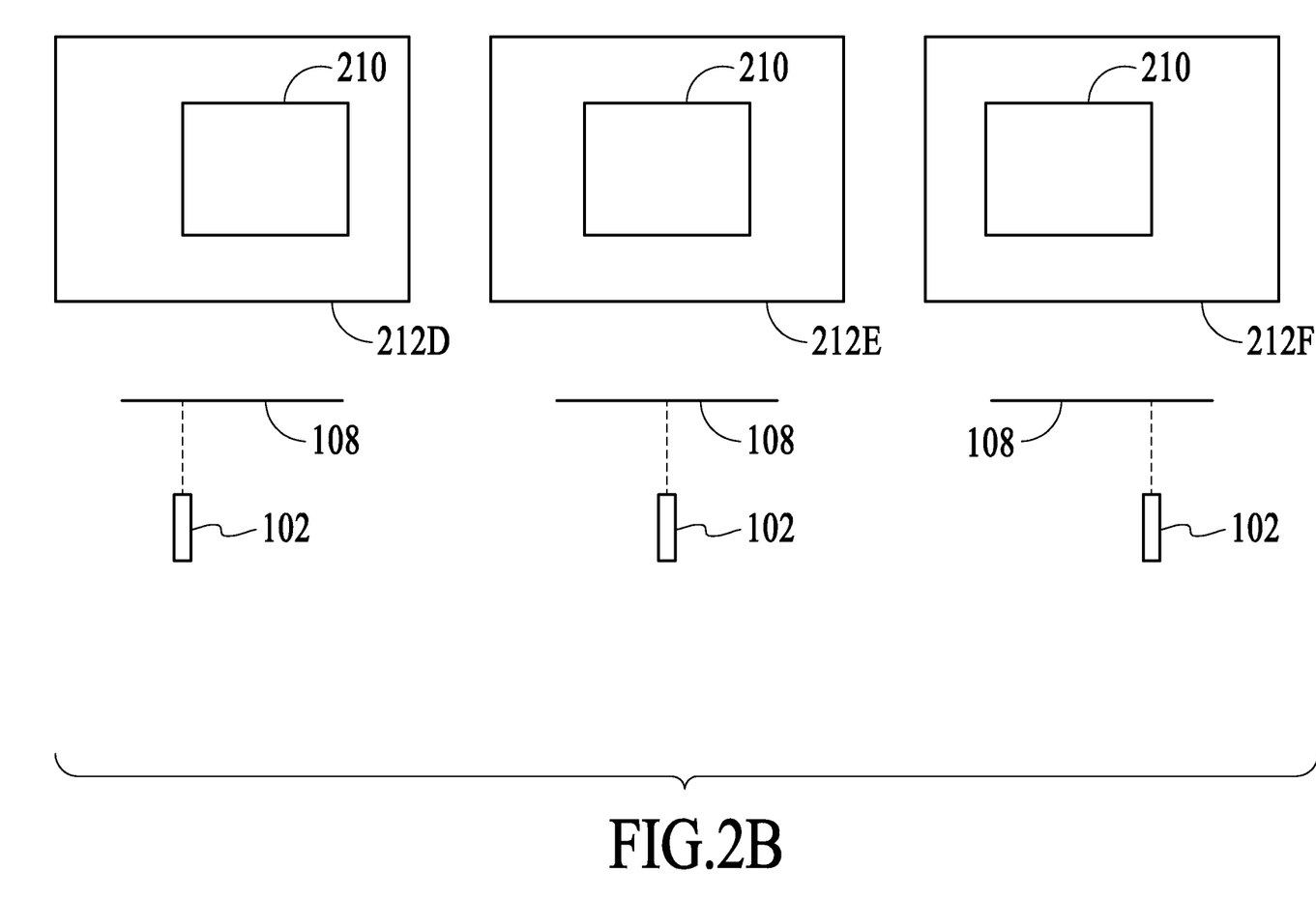
FIG. 2B illustrates an imaged display screen in captured image frames when the hand-held controller unit is moved laterally at a fixed distance from the display screen in accordance with an embodiment of the invention.
Figure 2C:
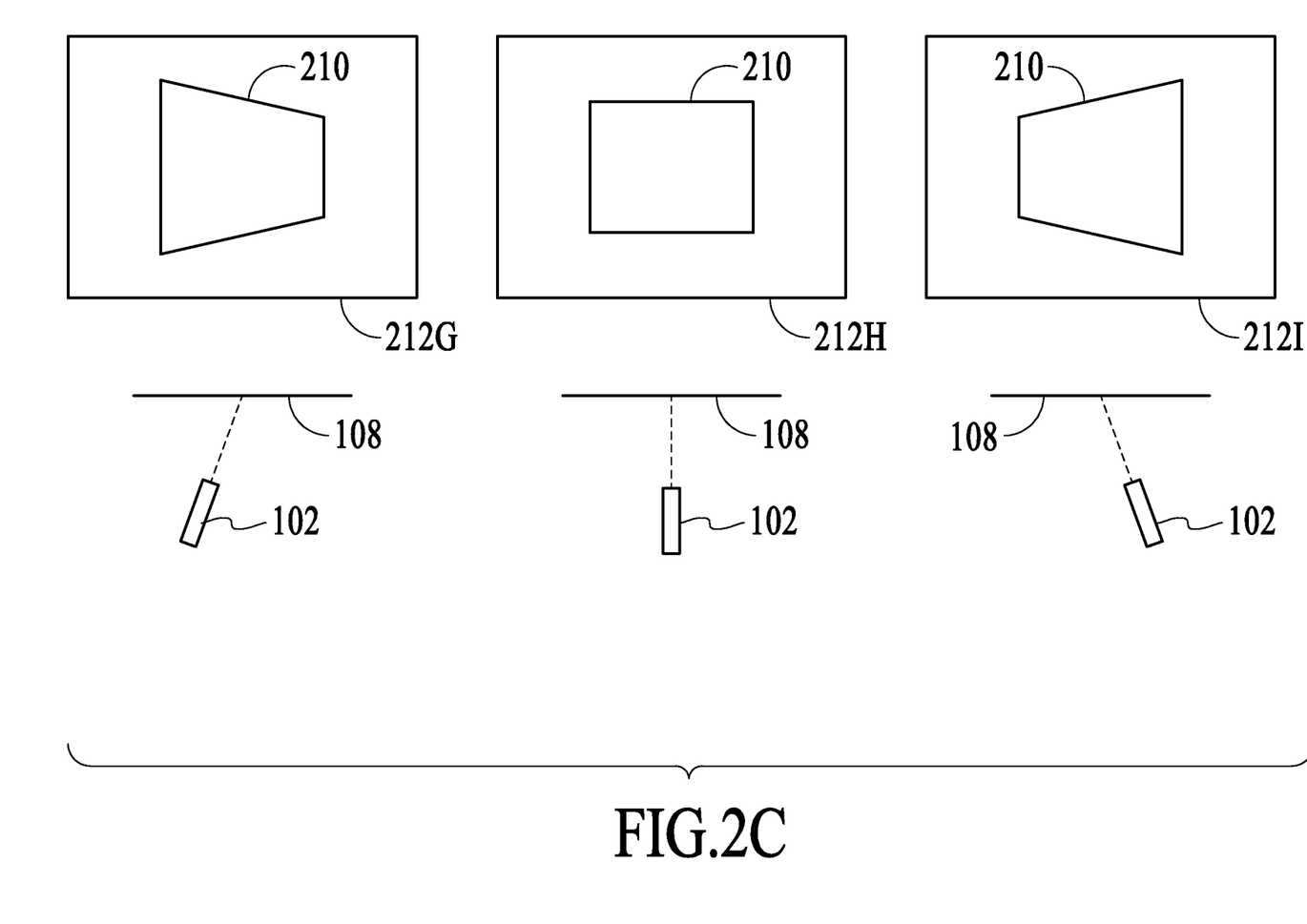
FIG. 2C illustrates an imaged display screen in captured image frames when the hand-held controller unit is moved such that the angle of the hand-held controller unit with respect to the display screen is changed in accordance with an embodiment of the invention.

FIGS. 2A-2C illustrate how the positional information of an imaged display screen in a captured image frame can be used to determine the relative position of the hand-held controller unit 102 with respect to the display screen 108. FIG. 2A illustrates an imaged display screen 210 in captured image frames 212A, 212B and 212C when the hand-held controller unit 102 is moved closer or farther from the display screen 108. As shown in the captured image frame 212A, when the hand-held controller unit 102 is positioned near the display screen 108, the size of the imaged display screen 210 is relatively large. Furthermore, since the hand-held controller unit 102 is positioned directly in front of the display screen 108 and pointed to the display screen in a direction normal to the surface of the display screen, the shape of the imaged display screen 210 is rectangular in shape. However, as described below, the shape of the imaged display screen 210 can be any quadrilateral shape, such as a trapezoid or any other four-sided polygon (also known as quadrangle or tetragon), depending on the relative position of the hand-held controller unit 102 with respect to the display screen 108. As shown in the captured image frame 212B, when the hand-held controller unit 102 is moved away from the display screen 108, the size of the imaged display screen 210 is decreased. However, the shape of the imaged display screen 210 has not changed, which indicates that the angle of the hand-held controller unit 102 with respect to the display screen 108 has not changed. As shown in the captured image frame 212C, when the hand-held controller unit 102 is moved farther away from the display screen 108, the size of the imaged display screen 210 is further decreased. However, the shape of the imaged display screen 210 again has not changed, which indicates that the angle of the hand-held controller unit 102 with respect to the display screen 108 has not changed.

FIG. 2B illustrates the imaged display screen 210 in captured image frames 212D, 212E and 212F when the hand-held controller unit 102 is moved laterally at a fixed distance from the display screen 108. That is, the hand-held controller unit 102 is moved on a plane parallel to the surface of the display screen 108, where the plane is at a fixed distance from the display screen. As shown in the captured image frame 212E, when the hand-held controller unit 102 is positioned near the front of the display screen 108, the imaged display screen 210 is correspondingly located near the center of the captured image frame. Furthermore, since the hand-held controller unit 102 is positioned directly in front of the display screen 108 and pointed to the display screen in a direction normal to the surface of the display screen, the shape of the imaged display screen 210 is rectangular in shape. As shown in the captured image frame 212D, when the hand-held controller unit 102 is moved laterally to the left, the imaged display screen 210 has shifted to the right in the captured image frame. However, the size and shape of the imaged display screen 210 have not noticeably changed, which indicates that the hand-held controller unit 102 is positioned at or near the same distance away from the display screen 108 and the angle of the hand-held controller unit 102 with respect to the display screen 108 has not changed. As shown in the captured image frame 212F, when the hand-held controller unit 102 is moved laterally to the right, the imaged display screen 210 has shifted to the left in the captured image frame. However, the size and shape of the imaged display screen 210 again have not noticeably changed, which indicates that the hand-held controller unit 102 is positioned at or near the same distance away from the display screen 108 and the angle of the hand-held controller unit 102 with respect to the display screen 108 has not changed. The imaged display screen 210 will be similarly shifted up or down in a captured image frame if the hand-held controller unit 102 is laterally moved down or up at a fixed distance from the display screen 108.

FIG. 2C illustrates the imaged display screen 210 in captured image frames 212G, 212H and 212I when the hand-held controller unit 102 is moved such that the angle of the hand-held controller unit 102 with respect to the display screen 108 is changed. As shown in the captured image frame 212H, when the hand-held controller unit 102 is positioned or orientated such that the hand-held controller unit 102 is pointing to the center of the display screen in a direction normal to the surface of the display screen 108, the imaged display screen 210 is located near the center of the captured image frame and the shape of the imaged display screen is rectangular. As shown in the captured image frame 212G, when the hand-held controller unit 102 is moved to the left and the angle of the hand-held controller unit is changed with the hand-held controller unit still pointed to the center of the display screen 108, the shape of the imaged display screen 210 is changed to a particular type of a quadrangle, i.e., a trapezoid, such that the left side of the trapezoidal shape of the imaged display screen is longer than its right side. However, the size of the imaged display screen 210 has not noticeably changed, which indicates that the hand-held controller unit 102 is still positioned at or near the same distance away from the display screen 108. As shown in the captured image frame 212I, when the hand-held controller unit 102 is moved to the right and the angle of the hand-held controller unit has changed with the hand-held controller unit still pointed to the center of the display screen 108, the shape of the imaged display screen 210 is changed such that the right side of the trapezoidal shape of the imaged display screen 210 is now longer than its left side. However, the size of the imaged display screen 210 has not noticeably changed, which indicates that the hand-held controller unit 102 is still positioned at or near the same distance away from the display screen 108. The shape of the imaged display screen 210 will be similarly changed in a captured image frame if the hand-held controller unit 102 is moved up or down and the angle of the hand-held controller unit is changed with the hand-held controller unit still pointed to the center of the display screen 108.

Although not illustrated, the shape of the imaged display screen in captured image frames can also be used to determine if the hand-held controller unit 102 is rotated with respect to the display screen 108 on a plane parallel to the surface of the display screen. When the hand-held controller unit 102 is rotated clockwise, the imaged display screen in captured image frames will similarly be rotated in the counterclockwise direction in the captured image frames. When the hand-held controller unit 102 is rotated counterclockwise, the imaged display screen in captured image frames will similarly be rotated in the clockwise direction in the captured image frames.

Thus, using the size and shape of the imaged display screen in captured image frames, the relative position of the hand-held controller unit 102 can be determined by image analysis. The relative position of the hand-held controller unit 102 includes, but is not limited to, the distance from the display screen 108 to the hand-held controller unit 102, the lateral distance of the hand-held controller unit from the center of the display screen, the angle of the hand-held controller unit with respect to the display screen and the rotational orientation of the hand-held controller unit with respect to the display screen. In addition, using the relative position of the hand-held controller unit 102 with respect to the display screen 108, the location on the display screen to which the hand-held controller unit is pointed (referred to herein as "the screen intercept"), can be determined.

Turning back to FIG. 1, the hand-held controller unit 102 of the optical navigation system 100 is configured to electronically capture frames of image data, which contains at least a portion of the display screen 108. The hand-held controller unit 102 is also configured to process the captured image frames to find the imaged display screen in the captured image frames in order to extract positional information of the imaged display screen, such as location, size and shape of the imaged display screen in the captured image frames. The hand-held controller unit 102 is further configured to calculate the relative position of the hand-held controller unit using the positional information of the imaged display screen and to output position data that indicates the relative position of the hand-held controller unit. The relative position of the hand-held controller unit 102 can be the position of the hand-held controller unit relative to a predefined coordinate system of the optical navigation system 100. The coordinate system of the optical navigation system 100 may be established during a calibration stage. Alternatively, the relative position of the hand-held controller unit 102 can be the position of the hand-held controller unit relative to the previous position of the hand-held controller unit. The output position data may include x, y and z position values along the X, Y and Z axes of the coordinate system of the optical navigation system 100. Alternatively, the output position data may include $\Delta x$, $\Delta y$ and $\Delta z$ values along the X, Y and Z axes of the coordinate system of the optical navigation system 100, which represent changes or displacements along the respective axes. The output position data may also include a value of the angle of the hand-held controller unit 102 with respect to the display screen 108 and a value of the rotational angle of the hand-held controller unit with respect to the display screen. Alternatively, the output position data may include a change in angle value or a change in rotational angle value.

The position data of the hand-held controller unit 102 is transmitted to the console unit 106, which is connected to the display device. In some embodiments, the console unit 106 is coupled to the display device 104 using conventional wiring. Alternatively, other wired or wireless connections may be implemented to provide connection between the console unit 106 and the display device 104. The console unit 106 processes the position data from the hand-held controller unit 102 for use in a particular application. As an example, the console unit 106 may be configured to manipulate a graphical element displayed on the screen 108 of the display device 104 according to the movements of the hand-held controller unit 102 as new position data is received from the hand-held controller unit. The console unit 106 may be a computer system, which runs one or more computer programs, such as gaming programs. In this embodiment, the console unit 106 may include components commonly found in a personal computer system.

Figure 3:
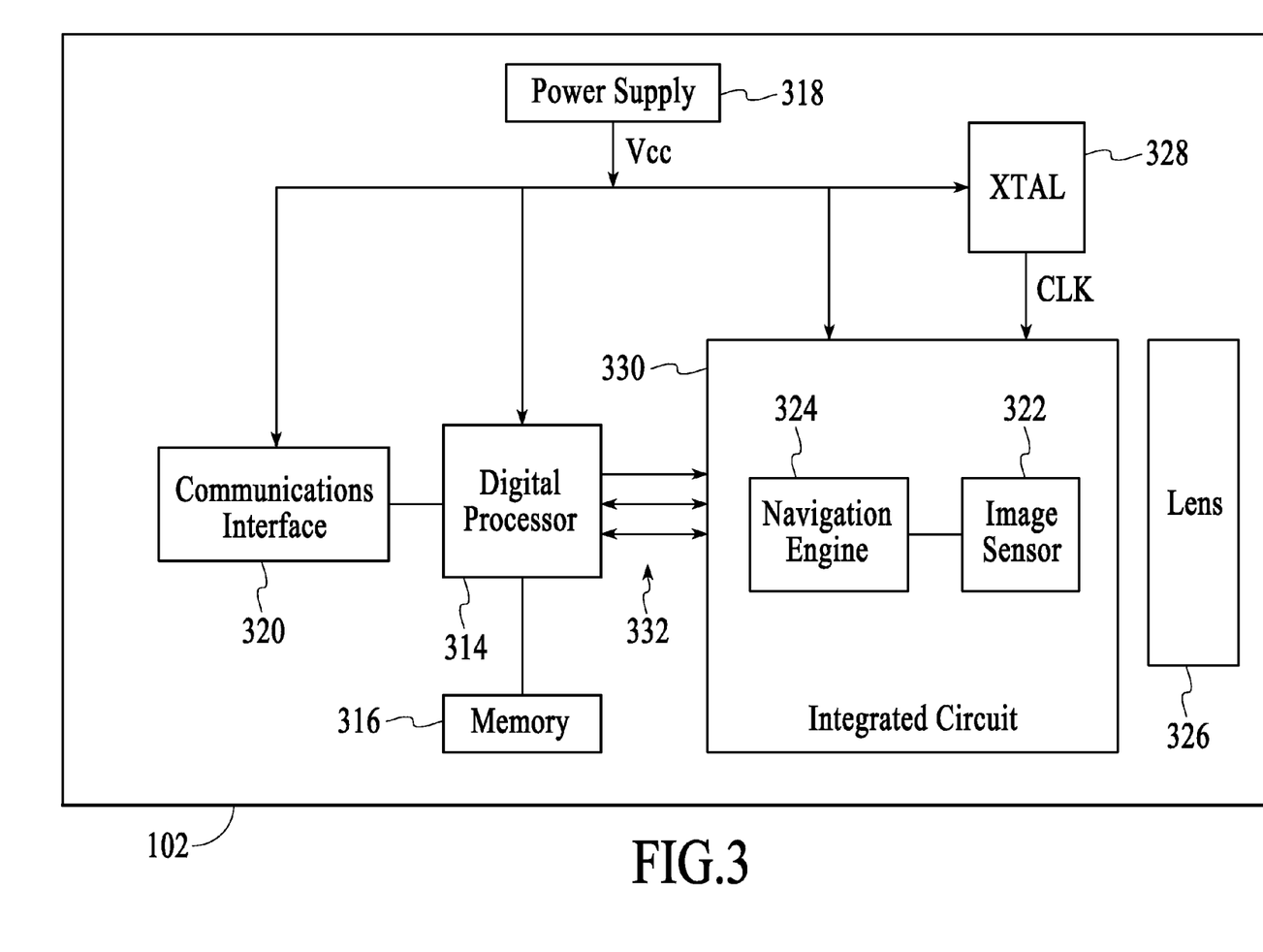
FIG. 3 is a block diagram of the hand-held controller unit of the optical navigation system of FIG. 1 in accordance with an embodiment of the invention.

Turning now to FIG. 3, a block diagram of the hand-held controller unit 102 in accordance with an embodiment of the invention is shown. The illustrated hand-held controller unit includes a digital processor 314, a memory device 316, a power supply 318, a communications interface 320, an image sensor 322, a navigation engine 324, an optical lens 326 and a crystal oscillator 328. In the illustrated embodiment, the navigation engine 324 and the image sensor 322 are part of an integrated circuit (IC) 330. However, in other embodiments, the image sensor 322 and the navigation engine 324 may be implemented as separate components. The IC 330 is connected to the digital processor 314 via one or more signal lines 332, which may include address, data and/or control signal lines. Although the hand-held controller unit 102 is shown to include certain components, the hand-held controller unit may include additional components. For example, some embodiments of the hand-held controller unit 102 include input buttons, joysticks or other user interfaces typically used for gaming controllers. Other embodiments of the hand-held controller unit 102 include feedback signal generators to generate a tactile or auditory feedback signal to a user.

In some embodiments, the digital processor 314 may be a general-purpose processor such as a microprocessor or microcontroller. In other embodiments, the digital processor 314 may be a special-purpose processor such as a digital signal processor. In other embodiments, the digital processor 314 may be another type of controller or a field programmable gate array (FPGA). In general, the digital processor 314 implements operations and functions of the hand-held controller unit 102.

The memory device 316 is configured to store data and/or instructions for use in the operation of the hand-held controller unit 102. In some embodiments, the memory device 316 stores instructions, which when executed by the digital processor 314, cause the digital processor to perform certain operations. Similarly, some instructions may be stored in memory integrated into the digital processor 314 or the IC 330. Additionally, the memory device 316 may store position data produced by the digital processor 314 and/or the navigation engine 324.

In an embodiment, the power supply 318 provides direct current (DC) electrical signal, Vcc, to the digital processor 314, as well as other components of the hand-held controller unit 102. Some embodiments of the power supply 318 include one or more batteries. In some embodiments, the power supply 318 receives power from the console unit 106 via a wire.

In a similar manner, the crystal oscillator 328 provides a clock signal, CLK, to one or more of the components of the hand-held controller unit 102.

The communications interface 320, which is coupled to the digital processor 314 is configured to transmit signals such as position data signals from the hand-held controller unit 102 to the console unit 106. The communications interface 320 may also be configured to receive control signals, or feedback signals, from the console unit 106. Additionally, the communications interface 320 may facilitate wired or wireless communications. For example, the communications interface 320 may send electrical signals via a hard-wired connection to the console unit 106. Alternatively, the communications interface 320 may send wireless signals, such as radio frequency (RF) signals, using known wireless data transmission protocols.

The image sensor 322, which is also coupled to the digital processor 314, is configured to capture frames of image data. The image sensor 322 includes an electronic imaging sensor array, such as a complimentary metal-oxide-semiconductor (CMOS) image sensor array or a charge-coupled device (CCD) image sensor array. For example, the image sensor 322 may include a 320×240 pixel array to capture frames of image data. However, other embodiments of the image sensor 322 may include a smaller or larger pixel array to capture frames of image data with lower or higher resolution. In the depicted embodiment, the image sensor 322 is used in conjunction with the optical lens 326. However, other embodiments may omit the lens 326, or implement multiple lenses.

In the illustrated embodiment, the navigation engine 324 is integrated with the image sensor 322 on the IC 330. In other embodiments, the navigation engine 324 may be partially or wholly integrated with the digital processor 314. Still in other embodiments, the navigation engine 324 may be partially or wholly incorporated into the console unit 106. In general, the navigation engine 324 processes frames of image data captured by the image sensor 322 to compute and output current position data with respect to the hand-held controller unit 102 using the imaged display screen in the captured image frames. During this process, the navigation engine 324 performs an operation that includes locating the imaged display screen in the captured image frames to extract positional information of the imaged display screen and then computing the relative position of the hand-held controller unit 102 using the positional information of the imaged display screen to produce position data for the computed relative position of the hand-held controller unit.

Figure 4:
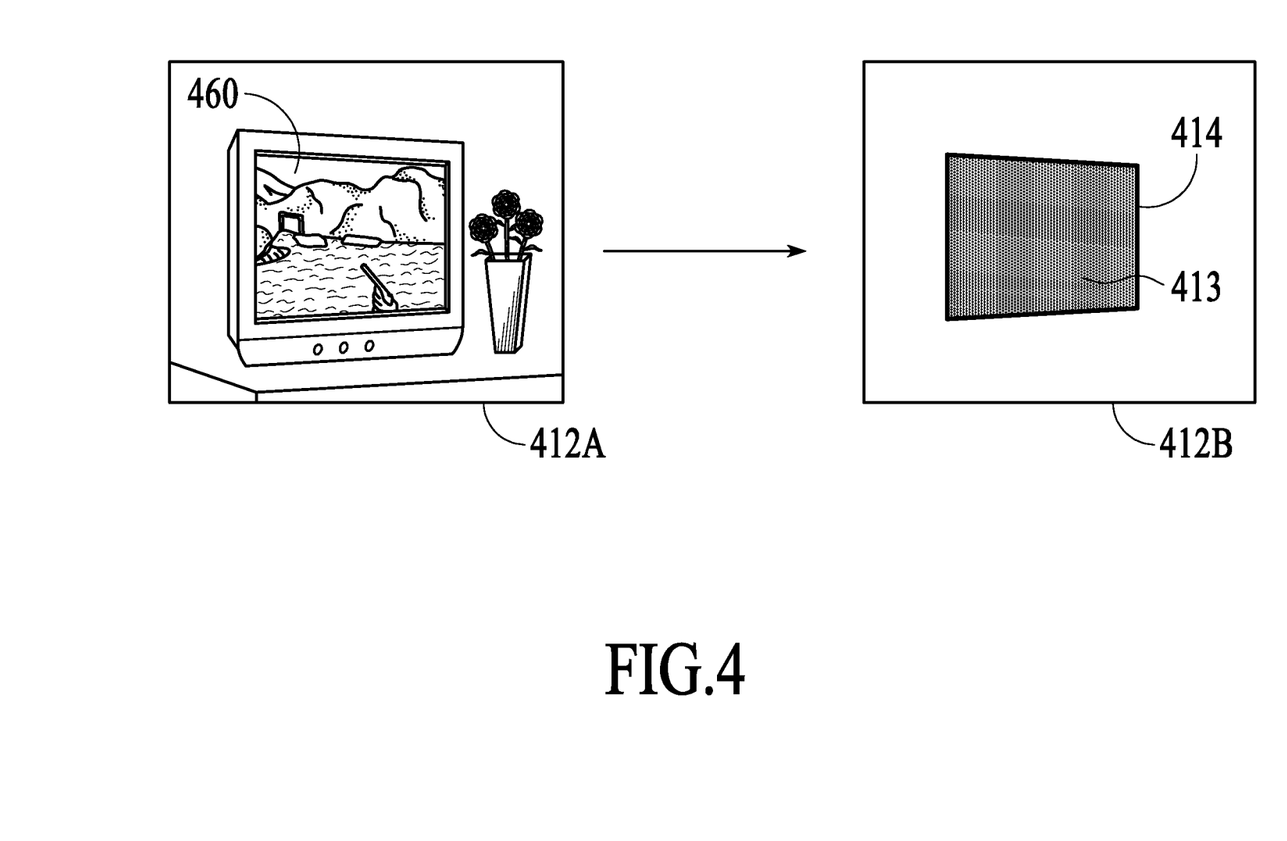
FIG. 4 illustrates a process of finding the imaged display screen in a captured image frame by thresholding in accordance with some embodiments of the invention.

In some embodiments, as illustrated in FIG. 4, the navigation engine 324 finds the imaged display screen 410 in a captured image frame 412A by comparing each pixel value of the captured image frame, e.g., the luminance value for each pixel, to a threshold value. The resulting image frame 412B will have a bright or dark quadrilateral region 413 defined by a quadrilateral outline 414 due to the thresholding, which represents the imaged display screen 410. As an example, the quadrilateral outline 414 may be a trapezoidal outline, depending on the relative position of the hand-held controller unit 102 with respect to the display screen 108.

The underlying basis for this approach is that the area within the imaged display screen in a captured image frame will most likely be brighter than the area outside of the imaged display screen. Thus, by thresholding the pixel values of the captured image frame, the area within the imaged display screen can be identified. As a result, the imaged display screen is located in the captured image. The outline of the identified quadrilateral region in the captured image frame is then used to extract positional information of the imaged display screen. In an embodiment, the extracted positional information of the imaged display screen includes locations of the corners of the identified quadrilateral outline, which may be represented by coordinates of a rectangular coordinate system based on the captured image frame where the center of the coordinate system is a predefined point in the captured image frame, e.g., the top left corner of the captured image frame. The corners of the identified quadrilateral outline may be found using the intersections of the sides or edges of the identified quadrilateral region.

Figure 5:
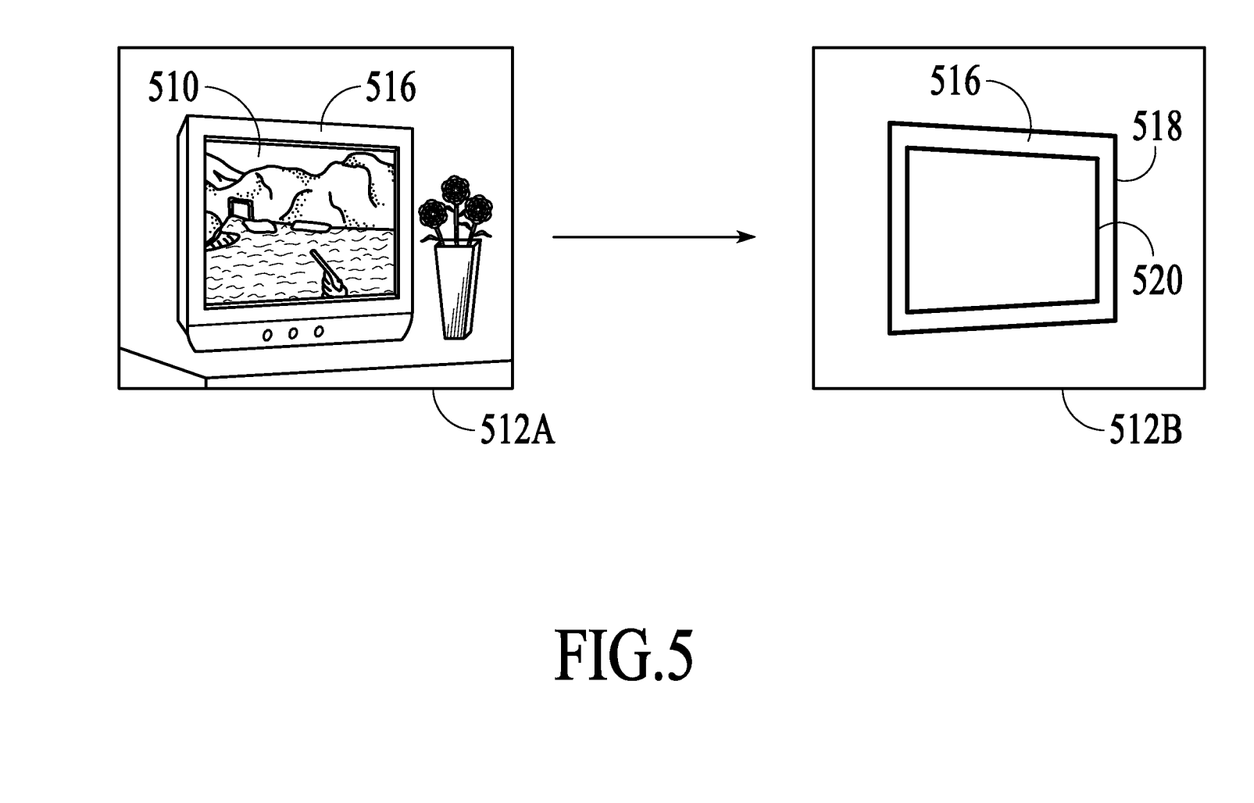
FIG. 5 illustrates a process of finding the imaged display screen in a captured image frame by searching for a frame of a display device in the image frame in accordance with other embodiments of the invention.

In other embodiments, as illustrated in FIG. 5, the navigation engine 324 finds the imaged display screen 510 in a captured image frame 512A by looking for a quadrilateral frame 516 having a uniform color. The quadrilateral frame 516 includes an outer quadrilateral outline 518 and an inner quadrilateral outline 520, as shown in the resulting image frame 512B. The inner quadrilateral outline 520 represents the outline of the imaged display screen 410 in the captured image frame 512A.

The underlying basis for this approach is that display devices typically have a rectangular frame surrounding the display screen. Thus, the inner outline of the rectangular frame is equivalent to the outline of the display screen. The rectangular frame is usually black, brown or some other uniform color. Thus, if the rectangular or other quadrilateral frame can be found in a captured image frame, the inner outline of the rectangular or quadrilateral frame can be used to identify the imaged display screen in the captured image frame. The inner outline of the quadrilateral frame in the captured image frame is then used to extract positional information of the imaged display screen. In an embodiment, the extracted positional information of the imaged display screen includes locations of the corners of the inner outline of the quadrilateral frame, which may be represented by coordinates of a rectangular coordinate system based on the captured image frame. The corners of the inner outline of the quadrilateral frame may be found using the intersections of the sides of the inner outline of the quadrilateral frame.

Figure 6:
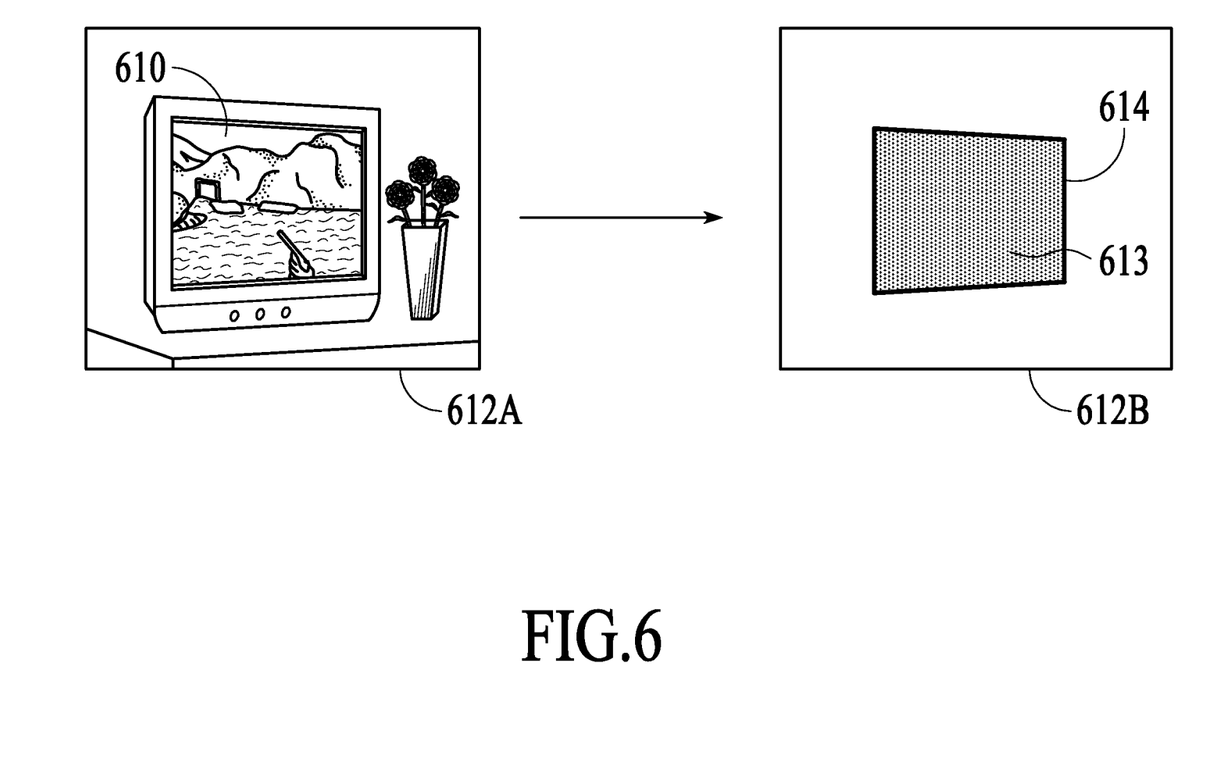
FIG. 6 illustrates a process of finding the imaged display screen in a captured image frame by searching for a quadrilateral region having a dominant color in the image frame in accordance with other embodiments of the invention.

In other embodiments, as illustrated in FIG. 6, the navigation engine 324 finds the imaged display screen 610 in a captured image frame 612A by searching for a quadrilateral region 613 having a dominant color, for example, a quadrilateral region that is mainly blue. The outline 614 of the quadrilateral region 613 having a dominant color in the resulting image frame 612B represents the imaged display screen 610 in the captured image frame 612A.

The underlying basis for this approach is that the imaged display screen in a captured image frame will sometimes include an image having a dominant color. Thus, by looking for a quadrilateral region having a dominant color, the area within the imaged display screen can be identified. As a result, the imaged display screen is located in the captured image. The identified quadrilateral outline in the captured image frame is then used to extract positional information of the imaged display screen. In an embodiment, the extracted positional information of the imaged display screen includes locations of the corners of the identified quadrilateral outline, which may be represented by coordinates of a rectangular coordinate system based on the captured image frame. The corners of the identified quadrilateral outline may be found using the intersections of the sides of the identified quadrilateral outline.

Figure 7:
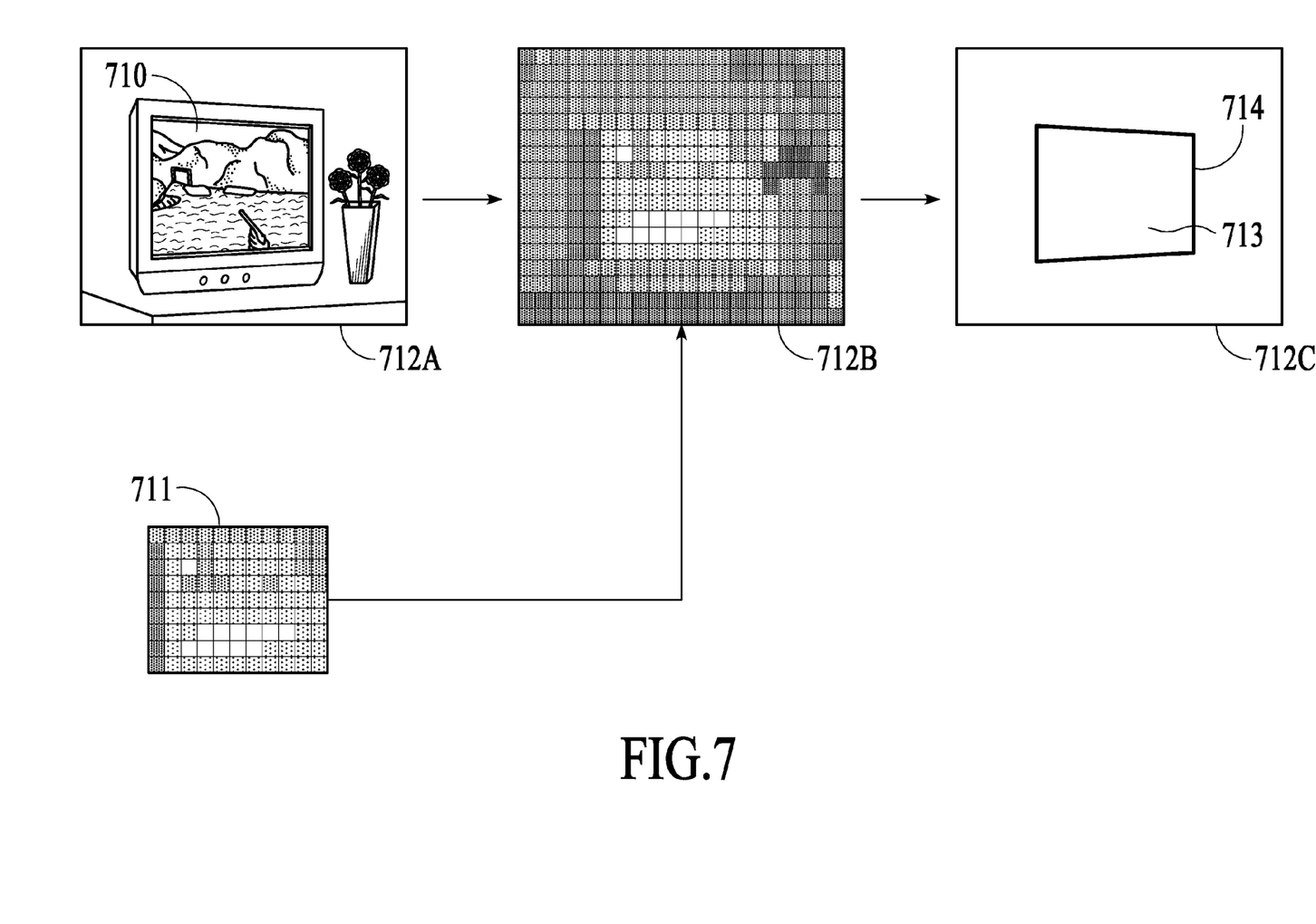
FIG. 7 illustrates a process of finding the imaged display screen in a captured image frame by comparing the image frame with a reference image in accordance with other embodiments of the invention.

In other embodiments, as illustrated in FIG. 7, the navigation engine 324 finds the imaged display screen 710 in a captured image frame 712A by searching for a quadrilateral region in the captured image frame similar to a reference image 711. The reference image 711 is the image currently being displayed on the display screen 108 of the display device 104. The reference image 711 may be a lower resolution version of the image being displayed on the display screen 108. In this implementation, the resolution of the captured image frame can be converted the same lower resolution of the reference image 711, as illustrated in the image frame 712B. In some embodiments, the reference image 711 is transmitted from the console unit 106 to the hand-held controller unit 102 to be used by the navigation engine 324. In other embodiments, the captured image frame 712A is transmitted to the console unit 106 to be used by the navigation engine 324 at the console unit, assuming that the connection between the console unit and the hand-held controller unit 102 has sufficient bandwidth. The captured image frame 712B is then compared with the reference image 711 to find a quadrilateral region 713 in the image frame that represents the imaged display screen 710. The outline 714 of the quadrilateral region 713 in the resulting image frame 712C represents the outline of the imaged display screen 710 in the captured image frame 712A.

The underlying basis for this approach is that the image on the display screen 108 can be used to find the imaged display screen in a captured image frame as a quadrilateral region. The outline of the identified quadrilateral region in the resulting image frame is then used to extract positional information of the imaged display screen. In an embodiment, the extracted positional information of the imaged display screen includes locations of the corners of the identified quadrilateral outline, which may be represented by coordinates of a rectangular coordinate system based on the captured image frame. The corners of the identified quadrilateral outline may be found using the intersections of the sides of the identified quadrilateral outline.

In some embodiments, the navigation engine 324 may use a common aspect ratio for a display screen to locate and/or to verify the quadrilateral area or outline that has been identified as the imaged display screen or the outline of the imaged display screen. As an example, the navigation engine 324 may determine whether the quadrilateral area or outline found in a captured frame of image data has an aspect ratio of 4:3 or 16:9, which is common for television and computer screens.

In some embodiments, the navigation engine 324 may use more than one of the above-described processes to find the imaged display screen in a frame of image data. As an example, the navigation engine 324 may dynamically switch from one process to another depending on the image currently being displayed on the display screen 108. As another example, the navigation engine 324 may switch from one process to another, depending on the effectiveness of the former process to find the imaged display screen in the captured image frames.

In some embodiments, the navigation engine 324 may extrapolate missing information of the imaged display screen in a captured image frame using the available information. As an example, a captured image frame may include only a portion of the imaged display screen such that a corner of the imaged display screen is missing from the captured image frame. In such a situation, the navigation engine 324 can use the locations of the three other corners and/or the sides of the identified display screen in the captured image frame to extrapolate the location of the missing corner of the imaged display screen. Thus, an estimated location of the missing corner of the imaged display screen can be calculated.

After the imaged display screen in a captured image frame is found and positional information of the imaged display screen has been extracted, the navigation engine 324 uses the positional information of the imaged display screen to calculate the position of the hand-held controller unit 102 with respect to the display screen 108. In some embodiments, only the outline of the imaged display screen and/or the locations of the corners of the imaged display screen in the captured image frame are used to calculate the relative position of the hand-held controller unit 102. The position of the hand-held controller unit 102 relative to the display screen 108 can be derived from the positional information of the imaged display screen by applying conventional mathematical calculations and using the concepts described herein. Alternatively, a look-up table can be used to determine the relative position of the hand-held controller unit 102 using the coordinates of the four corners of the imaged display screen. As previously stated, the relative position of the hand-held controller unit 102 includes, but is not limited to, the distance from the display screen 108 to the hand-held controller unit 102, the lateral distance of the hand-held controller unit from the center of the display screen, the angle of the hand-held controller unit with respect to the display screen and the rotational orientation of the hand-held controller unit with respect to the display screen. As a result, the navigation engine 324 generates position data that includes information regarding the current relative position of the hand-held controller unit 102.

In some embodiments, the navigation engine 324 may also perform scene-based navigation using lower resolution version of the captured image frames. The scene-based navigation is performed using conventional image correlation, which is typically used in computer mice applications. As an example, the image sensor 322 of the hand-held controller unit 102 can be sub-windowed to a 32×32 pixel array to capture lower resolution image frames, which can then be image correlated to track the movements of the hand-held controller unit 102. In these embodiments, the scene-based navigation can be performed for most of the tracking of the hand-held controller unit 102, while the screen-based navigation can be used sparingly for re-calibration. Using the scene-based navigation mode for most of the tracking of the hand-held controller unit 102 would result in significant power saving since scene-based navigation is less computationally intensive than the screen-based navigation mode.

Figure 8:
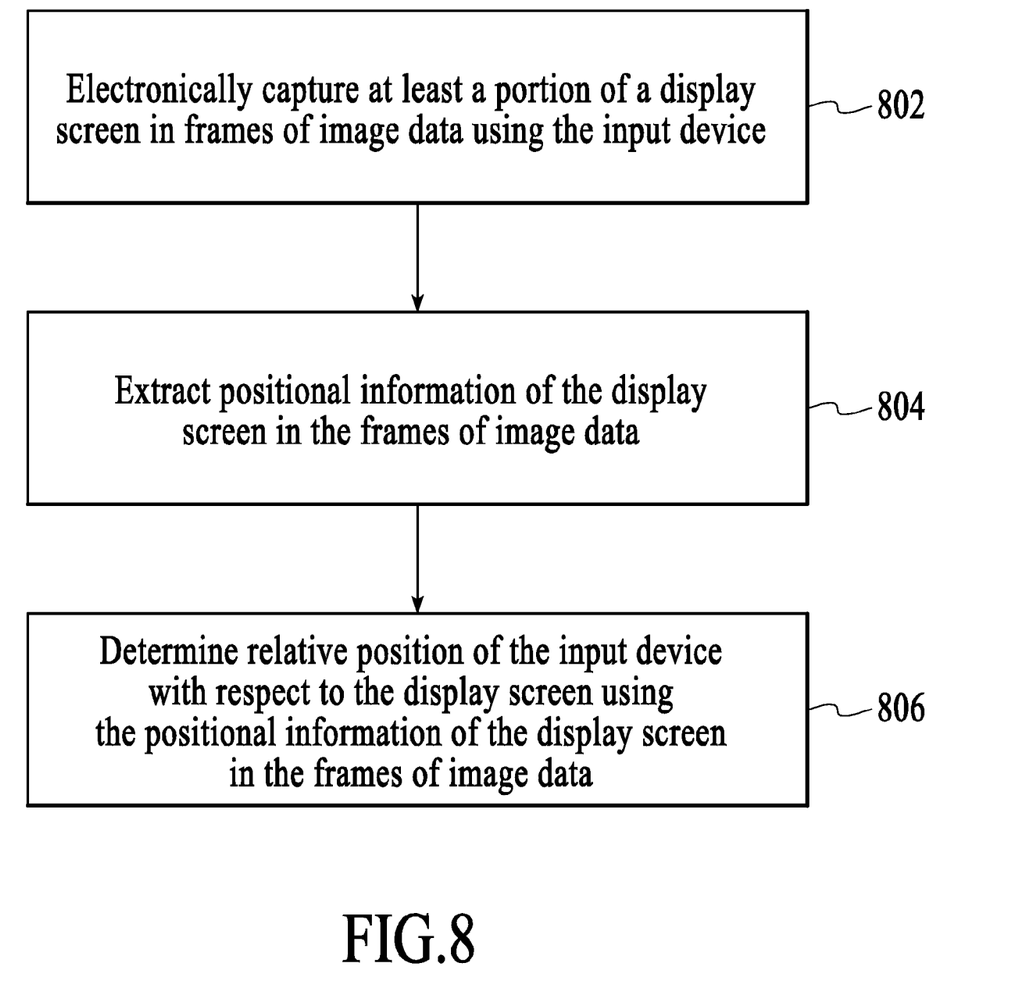
FIG. 8 is a process flow diagram of a method for tracking an input device in accordance with an embodiment of the invention.

A method for tracking an input device in accordance with an embodiment of the invention is described with reference to a process flow diagram of FIG. 8. At block 802, at least a portion of a display screen in frames of image data is electronically captured using the input device. Next, at block 804, positional information of the display screen in the frames of image data is extracted. Next, at block 806, relative position of the input device with respect to the display screen is determined using the positional information of the display screen in the frames of image data.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for tracking an input device, said method comprising:

electronically capturing at least a portion of a display screen in frames of image data without capturing any beacons using an image sensor array of said input device as said input device is moved relative to the display screen;

extracting different positional information of said display screen in said frames of image data without any beacons captured by said input device as said input device is moved relative to the display screen using only said portion of the display screen that is electronically captured in said frames of image data, including identifying at least a portion of an outline of said display screen to extract said different positional information of said display screen; and determining relative positions of said input device with respect to said display screen using said different positional information of said display screen in said frames of image data to track movements of said input device relative to said display screen.

2. The method of claim 1 wherein said extracting includes locating a plurality of corners of said display screen in said frames of image data, and wherein said determining includes determining said relative positions of said input device using locations of said corners of said display screen in said frames of image data.

3. The method of claim 2 wherein said extracting further includes calculating an estimated location of a missing corner of said display screen in one or more of said frames of image data.

4. The method of claim 1 wherein said extracting includes thresholding pixel values of said frames of image data to find said display screen in said image frames.

5. The method of claim 1 wherein said extracting includes searching for a quadrilateral area having a dominant color in said frames of image data to find said display screen in said frames of image data.

6. The method of claim 1 wherein said extracting includes searching for a quadrilateral area having an image pattern similar to a reference image pattern in said frames of image data to find said display screen in said frames of image data, said reference image pattern being associated with an image being displayed on said display screen.

7. The method of claim 1 further comprising performing scene-based navigation on some of said frames of image data to determine said relative positions of said input device.

8. The method of claim 7 wherein said performing includes converting some of said frames of image data to lower resolution frames of image data to reduce the amount of computations needed for said scene-based navigation.

9. A system for optical navigation, said system comprising:
an input device including an image sensor array configured to capture frames of image data as said input device is moved relative to a display screen, said frames of image data including at least a portion of said display screen without any beacons; and
a navigation engine operatively connected to said image sensor to process said frames of image data, said navigation engine being configured to extract different positional information of said display screen in said frames of image data without any beacons captured by said input device as said input device is moved relative to the display screen using only said portion of the display screen that is captured in said frames of image data, the navigation engine being configured to identify at least a portion of an outline of said display screen to extract said different positional information of said display screen, said navigation engine being further configured to determine relative positions of said input device with respect to said display screen using said different positional information of said display screen in said frames of image data to track movements of said input device relative to said display screen.

10. The system of claim 9 wherein said navigation engine is configured to locate a plurality of corners of said display screen in said frames of image data to extract said different positional information of said display screen in said frames of image data and to determine said relative positions of said input device using locations of said corners of said display screen in said frames of image data.

11. The system of claim 10 wherein said navigation engine is configured to calculate an estimated location of a missing corner of said display screen in one or more of said image frames to extract said different positional information of said display screen in said frames of image data.

12. The system of claim 9 wherein said navigation engine is configured to threshold pixel values of said frames of image data to find said display screen in said frames of image data.

13. The system of claim 9 wherein said navigation engine is configured to search for a quadrilateral area having a dominant color in said frames of image data to find said display screen in said frames of image data.

14. The system of claim 9 wherein said navigation engine is configured to search for a quadrilateral area having an image pattern similar to a reference image pattern in said frame of image data to find said display screen in said frames of image data, said reference image pattern being associated with an image being displayed on said display screen.

15. The system of claim 9 wherein said navigation engine is configured to perform scene-based navigation on some of said frames of image data to determine said relative position of said input device.

16. A method for tracking an input device, said method comprising:
electronically capturing at least a portion of a display screen as an imaged display screen in frames of image data without capturing any beacons using an image sensor array of said input device as said input device is moved relative to the display screen;
extracting different positional information of said imaged display screen in said frames of image data without any beacons captured by said input device as said input device is moved relative to the display screen, including searching for a quadrilateral frame having a uniform color in said frames of image data to find said display screen in said frames of image data, said searching including identifying at least a portion of an outline of said display screen to extract said different positional information of said display screen, said quadrilateral frame having an outer quadrilateral outline and an inner quadrilateral outline, said inner quadrilateral outline representing said display screen; and
determining relative positions of said input device with respect to said display screen using said different positional information of said imaged display screen in said frames of image data to track movements of said input device relative to said display screen.

\* \* \* \* \*